US010955648B2

(12) United States Patent
Peterson et al.

(10) Patent No.: US 10,955,648 B2
(45) Date of Patent: Mar. 23, 2021

(54) PROJECTION TELEVISION DEVICE AND SCREEN

(71) Applicant: SEIKO EPSON CORPORATION, Tokyo (JP)

(72) Inventors: Mark D. Peterson, Lake Oswego, OR (US); T Scott Engle, Beaverton, OR (US); Jeffrey Alan Gohman, Hillsboro, OR (US)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/230,336

(22) Filed: Dec. 21, 2018

(65) Prior Publication Data

US 2019/0113726 A1    Apr. 18, 2019

Related U.S. Application Data

(63) Continuation of application No. 15/226,377, filed on Aug. 2, 2016, now abandoned, which is a
(Continued)

(51) Int. Cl.
*G02B 13/06* (2006.01)
*G03B 21/10* (2006.01)
(Continued)

(52) U.S. Cl.
CPC ..... *G02B 17/0896* (2013.01); *G02B 13/0095* (2013.01); *G02B 13/04* (2013.01);
(Continued)

(58) Field of Classification Search
CPC ............... G02B 17/0896; G02B 17/08; G02B 17/0852; G02B 13/0095; G02B 13/04;
(Continued)

(56) References Cited

U.S. PATENT DOCUMENTS 1,961,803 A    6/1934  Trout
3,485,165 A   12/1969  Hughes
(Continued)

FOREIGN PATENT DOCUMENTS

EP    05-23988 A1   1/1993
GB    2367905 A     4/2002
(Continued)

OTHER PUBLICATIONS

Mar. 2, 2015 Office Action issued in U.S. Appl. No. 11/639,872.
(Continued)

*Primary Examiner* — Jerry L Brooks
(74) *Attorney, Agent, or Firm* — Oliff PLC

(57) ABSTRACT

A front projection display device is provided including an image-generating source configured to generate an image, a wide angle lens system adapted to receive the image, and a screen. The wide angle lens system may be configured to increase distortion of the image in a first stage and decrease distortion of the image in a second stage. The screen may be configured to receive the image from the wide angle lens system on a first side and reflect the image back to a viewer on the first side. In another embodiment, a screen is provided for a front projection system, the screen may be configured to receive light from a steep angle and may include any number of surface topographies configured to reflect light back to the viewer along a desired viewing plane.

24 Claims, 7 Drawing Sheets

Related U.S. Application Data continuation of application No. 14/942,568, filed on Nov. 16, 2015, now Pat. No. 9,429,826, which is a continuation of application No. 11/639,872, filed on Dec. 15, 2006, now Pat. No. 9,217,912, which is a continuation of application No. 10/754,093, filed on Jan. 6, 2004, now Pat. No. 7,150,537, which is a continuation-in-part of application No. 10/222,083, filed on Aug. 16, 2002, now Pat. No. 6,896,375, and a continuation-in-part of application No. 10/222,050, filed on Aug. 16, 2002, now Pat. No. 7,009,765.

(51) Int. Cl.
| | |
|---|---|
| G03B 21/14 | (2006.01) |
| G03B 21/60 | (2014.01) |
| G03B 21/28 | (2006.01) |
| H04N 9/31 | (2006.01) |
| G02B 17/08 | (2006.01) |
| G02B 13/16 | (2006.01) |
| G03B 21/06 | (2006.01) |
| G03B 21/00 | (2006.01) |
| G02B 17/00 | (2006.01) |
| G02B 13/00 | (2006.01) |
| G02B 13/04 | (2006.01) |
| G02B 27/00 | (2006.01) |

(52) U.S. Cl.
CPC .......... *G02B 13/06* (2013.01); *G02B 13/16* (2013.01); *G02B 17/008* (2013.01); *G02B 17/08* (2013.01); *G02B 17/0852* (2013.01); *G02B 27/0025* (2013.01); *G03B 21/005* (2013.01); *G03B 21/06* (2013.01); *G03B 21/10* (2013.01); *G03B 21/14* (2013.01); *G03B 21/145* (2013.01); *G03B 21/147* (2013.01); *G03B 21/28* (2013.01); *G03B 21/60* (2013.01); *H04N 9/317* (2013.01)

(58) Field of Classification Search
CPC ........ G02B 13/06; G02B 13/16; G03B 21/05; G03B 21/06; G03B 21/10; G03B 21/14; G03B 21/145; G03B 21/147; G03B 21/28; G03B 21/60; H04N 9/317
USPC .......................................................... 353/70
See application file for complete search history.

(56) References Cited

U.S. PATENT DOCUMENTS

| | | | |
|---|---|---|---|
| 3,712,707 A | 1/1973 | Henkes, Jr. | |
| 3,724,927 A * | 4/1973 | Cox | G03B 21/11 359/733 |
| 3,944,734 A | 3/1976 | Ogawa | |
| 4,060,310 A | 11/1977 | Brown | |
| 4,245,256 A | 1/1981 | Kokubo et al. | |
| 4,281,352 A | 7/1981 | Hoffman | |
| 4,385,313 A | 5/1983 | Slater et al. | |
| 4,431,273 A | 2/1984 | Nakamura | |
| 4,453,178 A | 6/1984 | Miyatake et al. | |
| 4,479,144 A | 10/1984 | Yamazaki et al. | |
| 4,674,836 A | 6/1987 | Yata et al. | |
| 4,729,631 A | 3/1988 | Takahashi et al. | |
| 4,730,897 A | 3/1988 | McKechnie et al. | |
| 4,773,731 A | 9/1988 | Goldenberg et al. | |
| 4,875,777 A | 10/1989 | Harding | |
| 4,880,292 A | 11/1989 | Kageyama et al. | |
| 4,921,330 A | 5/1990 | Takahashi et al. | |
| 4,927,248 A | 5/1990 | Sakakibara et al. | |
| 4,936,657 A | 6/1990 | Tejima et al. | |
| 4,979,801 A | 12/1990 | Park | |
| 5,032,022 A | 7/1991 | Sato et al. | |
| RE33,795 E | 1/1992 | Ogino | |
| 5,100,222 A | 3/1992 | Minoura et al. | |
| 5,218,480 A | 6/1993 | Moskovich | |
| 5,220,363 A | 6/1993 | Sato et al. | |
| 5,302,983 A | 4/1994 | Sato et al. | |
| 5,408,282 A | 4/1995 | Nagashima et al. | |
| 5,422,691 A | 6/1995 | Ninomiya et al. | |
| 5,434,713 A | 7/1995 | Sato | |
| 5,442,413 A | 8/1995 | Tejima et al. | |
| 5,442,484 A * | 8/1995 | Shikawa | G02B 13/04 348/602 |
| 5,442,691 A | 8/1995 | Price et al. | |
| 5,477,394 A | 12/1995 | Shibazaki | |
| 5,489,940 A | 2/1996 | Richardson et al. | |
| 5,495,306 A | 2/1996 | Shibazaki | |
| 5,500,747 A | 3/1996 | Tanide et al. | |
| 5,537,251 A | 7/1996 | Shimada | |
| 5,580,143 A | 12/1996 | Behr | |
| 5,580,146 A | 12/1996 | Maslow | |
| 5,594,563 A | 1/1997 | Larson | |
| 5,594,588 A | 1/1997 | Togino | |
| 5,622,419 A | 4/1997 | Holder et al. | |
| 5,699,131 A | 12/1997 | Aoki et al. | |
| 5,710,668 A | 1/1998 | Gohman et al. | |
| 5,716,118 A | 2/1998 | Sato et al. | |
| 5,724,195 A | 3/1998 | Enomoto et al. | |
| 5,760,973 A | 6/1998 | Kawamura | |
| 5,793,339 A | 8/1998 | Takahashi | |
| 5,796,528 A | 8/1998 | Mihara | |
| 5,805,359 A | 9/1998 | Yamanashi | |
| 5,818,639 A | 10/1998 | Furuya | |
| 5,820,240 A | 10/1998 | Ohzawa | |
| 5,833,339 A | 11/1998 | Sarayeddine | |
| 5,870,234 A | 2/1999 | Ebbesmeier nee Schitthof | |
| 5,923,479 A | 7/1999 | Nagata | |
| 5,969,874 A | 10/1999 | Moskovich | |
| 5,973,848 A * | 10/1999 | Taguchi | G02B 13/22 359/651 |
| 5,978,051 A | 11/1999 | Gohman et al. | |
| 5,982,537 A | 11/1999 | Koizumi et al. | |
| 5,982,553 A | 11/1999 | Bloom et al. | |
| 5,999,332 A | 12/1999 | Ohno | |
| 6,008,951 A | 12/1999 | Anderson | |
| 6,016,229 A | 1/2000 | Suzuki | |
| 6,018,425 A | 1/2000 | Nakabayashi et al. | |
| 6,023,369 A | 2/2000 | Goto | |
| 6,023,373 A | 2/2000 | Inoguchi et al. | |
| 6,038,085 A | 3/2000 | Nakazawa | |
| 6,046,859 A | 4/2000 | Raj | |
| 6,052,226 A | 4/2000 | Takahashi | |
| 6,053,615 A | 4/2000 | Peterson et al. | |
| 6,081,380 A | 6/2000 | Ohshima et al. | |
| 6,084,707 A | 7/2000 | Maruyama et al. | |
| 6,088,172 A | 7/2000 | Sato | |
| 6,091,550 A | 7/2000 | Hayashi et al. | |
| 6,111,701 A | 8/2000 | Brown | |
| 6,123,425 A | 9/2000 | Ohzawa | |
| 6,129,437 A | 10/2000 | Koga et al. | |
| 6,129,552 A | 10/2000 | Deshoux et al. | |
| 6,137,638 A | 10/2000 | Yamagishi et al. | |
| 6,144,503 A | 11/2000 | Sugano | |
| 6,147,812 A | 11/2000 | Narimatsu et al. | |
| 6,188,523 B1 | 2/2001 | Choi | |
| 6,201,647 B1 | 3/2001 | Ohzawa | |
| 6,236,511 B1 | 5/2001 | Brown | |
| 6,239,917 B1 | 5/2001 | Tadic-Galeb et al. | |
| 6,273,338 B1 | 8/2001 | White | |
| 6,273,570 B1 * | 8/2001 | Clifton | H04N 9/3141 348/E9.027 |
| 6,299,313 B1 | 10/2001 | Hirata et al. | |
| 6,301,058 B2 | 10/2001 | Nagahara | |
| 6,307,675 B1 | 10/2001 | Abe et al. | |
| 6,348,993 B1 | 2/2002 | Hori | |
| 6,353,509 B1 | 3/2002 | Nakazawa | |
| 6,366,400 B1 | 4/2002 | Ohzawa | |
| 6,379,012 B1 | 4/2002 | Enochs et al. | |
| 6,384,987 B1 | 5/2002 | Sensui | |
| 6,396,641 B2 | 5/2002 | Hirata et al. | |
| 6,400,504 B2 | 6/2002 | Miyata | |

(56) References Cited

U.S. PATENT DOCUMENTS

| | | |
|---|---|---|
| 6,406,150 B1 | 6/2002 | Burstyn |
| 6,407,859 B1 | 6/2002 | Hennen et al. |
| 6,407,860 B1 | 6/2002 | Funazaki et al. |
| 6,416,181 B1 | 7/2002 | Kessler et al. |
| 6,417,966 B1 | 7/2002 | Moshrefzadeh et al. |
| 6,419,365 B1 | 7/2002 | Potekev et al. |
| 6,457,834 B1 * | 10/2002 | Cotton .............. G02B 27/0025 353/122 |
| 6,466,369 B1 | 10/2002 | Maddock |
| 6,471,359 B1 | 10/2002 | Kim et al. |
| 6,473,236 B2 | 10/2002 | Tadic-Galeb et al. |
| 6,485,145 B1 | 11/2002 | Cotton et al. |
| 6,493,032 B1 | 12/2002 | Wallerstein et al. |
| 6,513,935 B2 | 2/2003 | Ogawa |
| 6,520,464 B1 | 2/2003 | Morrissey et al. |
| 6,520,646 B2 | 2/2003 | Rodriguez, Jr. et al. |
| 6,530,664 B2 | 3/2003 | Vanderwerf et al. |
| 6,554,430 B2 | 4/2003 | Dorval et al. |
| 6,561,649 B1 | 5/2003 | Burstyn |
| 6,574,041 B1 | 6/2003 | Chen |
| 6,624,952 B2 * | 9/2003 | Kuwa .................... G02B 13/04 353/31 |
| 6,626,541 B2 | 9/2003 | Sunaga |
| 6,636,361 B2 | 10/2003 | Wada |
| 6,652,104 B2 | 11/2003 | Nishida et al. |
| 6,726,859 B2 | 4/2004 | Suzuki et al. |
| 6,752,500 B1 | 6/2004 | Yoshii et al. |
| 6,768,594 B2 | 7/2004 | Imafuku et al. |
| 6,788,460 B2 | 9/2004 | Knox et al. |
| 6,804,055 B2 | 10/2004 | Peterson et al. |
| 6,806,850 B2 | 10/2004 | Chen |
| 6,808,271 B1 | 10/2004 | Kurematsu |
| 6,813,094 B2 | 11/2004 | Kaminsky et al. |
| 6,853,493 B2 | 2/2005 | Kreitzer |
| 6,877,862 B2 | 4/2005 | Fukunaga et al. |
| 6,880,934 B2 | 4/2005 | Lee |
| 6,883,920 B2 | 4/2005 | Chen |
| 7,009,765 B2 | 3/2006 | Gohman |
| 7,088,509 B2 | 8/2006 | Peterson et al. |
| 7,116,476 B2 | 10/2006 | Suzuki et al. |
| 7,150,537 B2 * | 12/2006 | Peterson .............. G02B 13/06 353/79 |
| 9,217,912 B2 | 12/2015 | Peterson et al. |
| 9,429,826 B2 | 8/2016 | Peterson et al. |
| 2001/0050758 A1 | 12/2001 | Suzuki et al. |
| 2002/0008853 A1 | 1/2002 | Sunaga |
| 2002/0019283 A1 | 2/2002 | Mitsubayashi et al. |
| 2002/0044263 A1 | 4/2002 | Takeuchi |
| 2002/0122161 A1 | 9/2002 | Nishida et al. |
| 2002/0140912 A1 | 10/2002 | Cotton et al. |
| 2002/0141053 A1 | 10/2002 | Colucci et al. |
| 2002/0163626 A1 | 11/2002 | Takizawa et al. |
| 2003/0025885 A1 | 2/2003 | Cotton et al. |
| 2003/0038999 A1 | 2/2003 | Knox et al. |
| 2003/0053206 A1 | 3/2003 | Togino |
| 2003/0169513 A1 | 9/2003 | Kaminsky et al. |
| 2003/0231261 A1 | 12/2003 | Bassi et al. |
| 2004/0001254 A1 | 1/2004 | Shimizu |
| 2004/0156117 A1 | 8/2004 | Takaura et al. |
| 2004/0227990 A1 | 11/2004 | Peterson et al. |
| 2004/0246578 A1 | 12/2004 | Shikama et al. |
| 2005/0190434 A1 * | 9/2005 | Betensky .............. G02B 15/12 359/356 |

FOREIGN PATENT DOCUMENTS

| | | |
|---|---|---|
| JP | 59-229522 A | 12/1984 |
| JP | 63-052585 A | 3/1988 |
| JP | 01-188815 A | 7/1989 |
| JP | 02-079037 A | 3/1990 |
| JP | 03-122607 A | 5/1991 |
| JP | 04-195030 A | 7/1992 |
| JP | 05-027345 A | 2/1993 |
| JP | 05-100312 A | 4/1993 |
| JP | 29-89947 | 5/1993 |
| JP | 05-158151 A | 6/1993 |
| JP | 05-303055 A | 11/1993 |
| JP | 62-73693 A | 9/1994 |
| JP | 07-013157 A | 1/1995 |
| JP | H08-262393 A | 10/1996 |
| JP | 10-501388 A | 2/1998 |
| JP | H10-153736 A | 6/1998 |
| JP | 11-337863 A | 12/1999 |
| JP | 11-344668 A | 12/1999 |
| JP | 2000513114 A | 10/2000 |
| JP | 31-13941 B2 | 12/2000 |
| JP | 2001-004955 A | 1/2001 |
| JP | 2001-296497 A | 10/2001 |
| JP | 2002-082385 A | 3/2002 |
| JP | 2002-122807 A | 4/2002 |
| JP | 2002-196413 A | 7/2002 |
| JP | 2002-365541 A | 12/2002 |
| JP | 2004-526183 A | 8/2004 |
| JP | 2004-258620 A | 9/2004 |
| JP | 04-240979 B2 | 3/2009 |
| WO | 98/029773 A1 | 7/1998 |
| WO | 02/21851 A2 | 3/2002 |
| WO | 02/27399 A1 | 4/2002 |

OTHER PUBLICATIONS

Jan. 17, 2012 examination result of corresponding Japanese Patent Application No. 2006-549400.
Jan. 30, 2009 Search Report issued in European Patent Application No. 03788290.9.
The Photonics Dictionary, Book 4, 49th International Edition, 2003, pp. D-74 and D-148, Laurin Publishing, Pittsfield, MA.
Kanayama, H. et al. "A New LC Rear-Projection Display Based on the Aspherical Mirror Projection System." IOW 2000, pp. 1041-1044. SANYO Electric Co., Ltd.; Osaka, Japan.
Ouellette, Jennifer. "Digital Displays with Micromirror Devices." American Institute of Physics, Jun. 1997. vol. 3, No. 2. pp. 9-11. College Park, MD.
Shinozaki, J. et al. "15.3: A 50-in. Ultra-Slim Liquid-Crystal Rear Projector." SID 1992 Digest, pp. 273-276. Society for Information Display; San Jose, CA.
Oct. 10, 2013 Office Action issued in U.S. Appl. No. 11/639,872.
Mar. 19, 2013 Office Action issued in U.S. Appl. No. 11/639,872.
Jun. 22, 2012 Office Action issued in U.S. Appl. No. 11/639,872.
Jan. 6, 2012 Office Action issued in U.S. Appl. No. 11/639,872.
May 27, 2011 Office Action issued in U.S. Appl. No. 11/639,872.
Oct. 14, 2010 Office Action issued in U.S. Appl. No. 11/639,872.
Jan. 22, 2010 Office Action issued in U.S. Appl. No. 11/639,872.
Jan. 22, 2016 Office Action issued in U.S. Appl. No. 14/942,568.
Dec. 29, 2016 Office Action Issued in U.S. Appl. No. 14/526,086.
Jan. 10, 2017 Office Action Issued in U.S. Appl. No. 15/226,283.

* cited by examiner

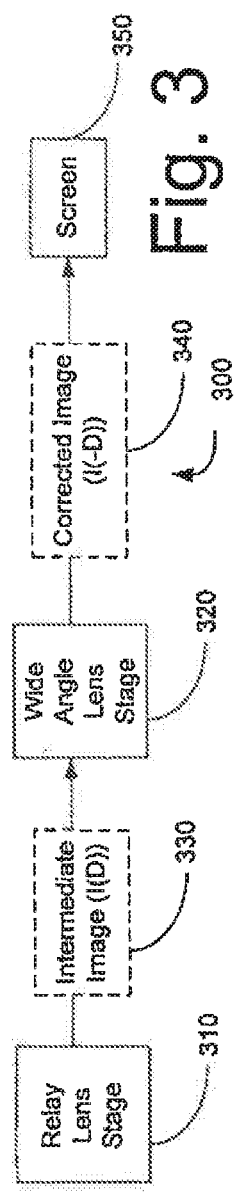
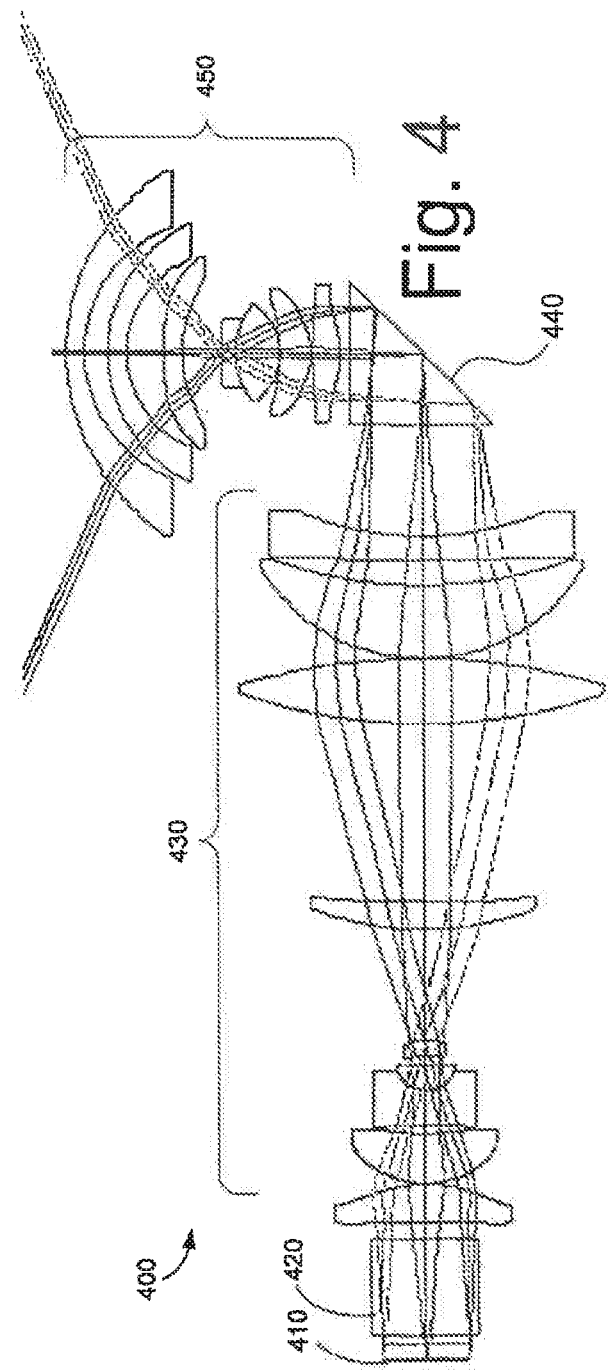

PROJECTION TELEVISION DEVICE AND SCREEN

CROSS-REFERENCE TO RELATED APPLICATIONS

This is a Continuation of U.S. application Ser. No. 15/226,377 filed Aug. 2, 2016, which is a Continuation of U.S. application Ser. No. 14/942,568 filed Nov. 16, 2015 (now U.S. Pat. No. 9,429,826), which is a Continuation of application Ser. No. 11/639,872 filed Dec. 15, 2006 (now U.S. Pat. No. 9,217,912), which is a Continuation of application Ser. No. 10/754,093 filed Jan. 6, 2004, which is a Continuation-In-Part of application Ser. No. 10/222,083 filed Aug. 16, 2002 (now U.S. Pat. No. 6,896,375), and a Continuation-In-Part of application Ser. No. 10/222,050 filed Aug. 16, 2002 (now U.S. Pat. No. 7,009,765). The disclosures of the prior applications are hereby incorporated by reference herein in their entireties.

BACKGROUND

There are many ways of projecting or displaying an image on a display surface. One method of generating a large screen display is the use of a projection device, such as a projection television. Two types of projection televisions are rear projection televisions and front projection televisions. Typically, the components of a rear projection television are contained in a single unit. In contrast, with a front projection television, the components of the television may be separated from each other. For example, in some front projection television systems, some of the components may be disposed in a first location, while another components may be disposed at a second location.

Components of projection televisions typically include a projector and a screen. An image may be generated by the projector and displayed on the screen. The type of projector and/or screen, or combination thereof, may affect the quality of a displayed image.

SUMMARY

A front projection display device is provided including an image-generating source configured to generate an image, a wide angle lens system adapted to receive the image, and a screen. The wide angle lens system may be configured to increase distortion of the image in a first stage and decrease distortion of the image in a second stage. The screen may be configured to receive the image from the wide angle lens system on a first side and reflect the image back to a viewer on the first side. In another embodiment, a screen is provided for a front projection system, the screen may be configured to receive light from a steep angle and may include any number of surface topographies configured to reflect light back to the viewer along a desired viewing plane.

BRIEF DESCRIPTION OF THE DRAWINGS

FIG. 3 is a block diagram of a lens system that may be used in the front projection display device of FIG. 2 according to an embodiment of the present disclosure.

FIG. 4 is a schematic illustration of a lens system that may be used in the front projection display device of FIG. 2 according to an embodiment of the present disclosure.

DETAILED DESCRIPTION

A display device incorporating an optical system capable of producing a large image within a short distance is described below. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Figure 1:
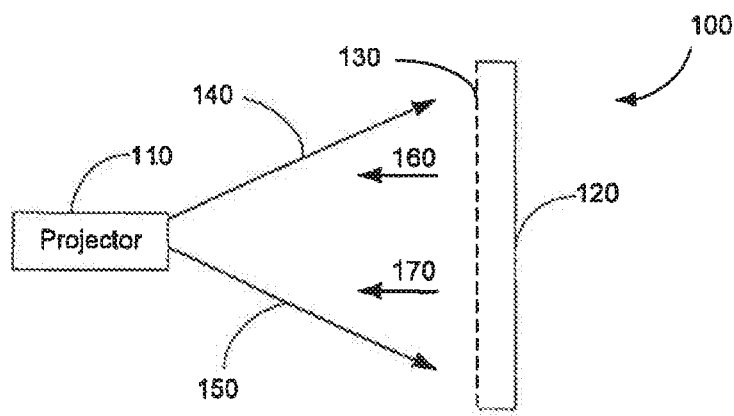
FIG. 1 is a schematic illustration of a conventional front projection display device.

FIG. 1 illustrates a conventional front projection display device. Front projection display device 100 includes a projector 110 and a screen 120. Screen 120 may be any suitable display surface. For example, in some embodiments, screen 120 may be a Fresnel screen. Typically, screen, 120 includes a screen surface 130.

During operation of front projection display 100, projector 110 may be configured to generate an image and project the image on to screen 120. Screen 120 may reflect the projected image and direct it toward a viewer (not shown). In some embodiments, screen surface 130 may scatter light so that the projected image is visible to the viewer. Rays 140 and 150 illustrate exemplary paths that light may travel from projector 110 to screen 120, while rays 160 and 170 illustrate exemplary paths that light may travel after reflecting off of screen 120.

Various types of screen surfaces with variable topography may be used to reflect an image toward a viewer. For example, the screen surface may be a glass-bead screen surface or a bumpy screen surface. A glass-bead screen surface typically has a plurality of small glass marbles embedded in a transparent coating on the surface of screen 130. Such surfaces may be inadequate for some types of projection systems, such as the system described in FIG. 2. Moreover, such glass-based screens and bumpy-surface screens may be difficult to clean, which may affect the quality of the image reflected off of such screens.

In some embodiments, light impinging screen 120 may be diffused back to the viewer such that near retro-reflection occurs when light hits these screens at the proper angle. Retro-reflection is reflection in which light is returned in directions close to the direction from which it came. Thus, light hitting such a screen almost straight onto the surface of the screen may be bent back in the direction of a viewer sitting in front of the screen. The use of such retro-reflection may be not be possible in systems such as the system described in FIG. 2.

Figure 2:
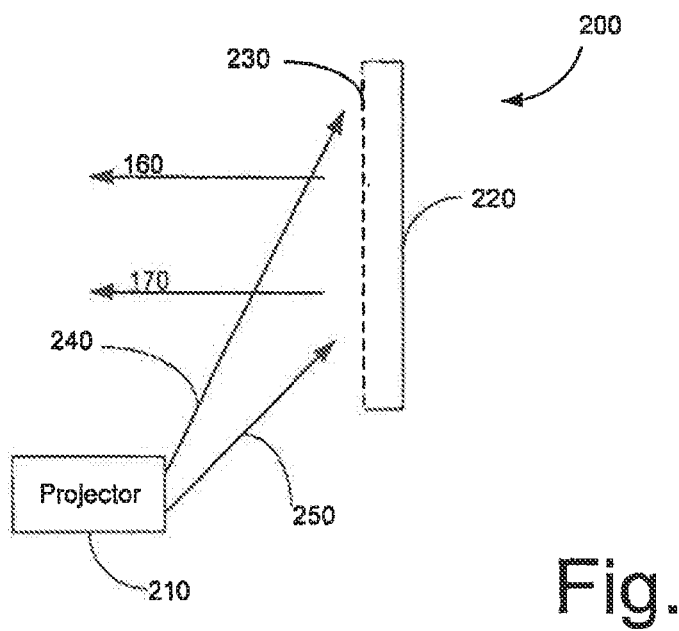
FIG. 2 is another schematic illustration of another front projection display device according to an embodiment of the present disclosure.

FIG. 2 illustrates schematically, at 200, another front projection display device. As described above, front projection display device includes a projector 210 and a screen 220. Screen 220 may include a screen surface 230.

Projector 210 may be configured to project light at a steep angle from the horizontal to screen 220. For example, projector 210 may be offset from screen 220 such that light is projected onto screen 220 at an angle between approximately 30 to 80 degrees from the horizontal. The angle of reflection may vary along the screen. Rays 240 and 250 illustrate exemplary paths that light may travel from projector 210 to screen 220. For exemplary purposes only, ray 240 is shown reflecting and diffusing off of the screen at an angle 245. Angle 245 may be any suitable angle, such as an 80 degree angle. Similarly, ray 250 is shown reflecting off of the screen at angle 255. Angle 255 may be any suitable angle, for example angle 255 may be a 30 degree angle. As with FIG. 1, rays 160 and 170 illustrates the path that light may travel after reflecting off of screen 220. In such systems, retro-reflection may be inadequate to display an image to a viewer.

In one embodiment of the present disclosure, projector 210 may be a wide-angle projector. One exemplary wide angle system which may be implemented in a front projection system is described in U.S. patent application Ser. No. 10/222,050 entitled "WIDE Angle Lens System Having a Distorted. Intermediate Image" filed Aug. 16, 2002, which is incorporated herein by reference.

In one exemplary wide angle system, illustrated schematically in FIG. 3, the system 300 may include a relay lens stage 310 and a wide angle lens stage 320. Relay lens stage 310 may be configured to generate and project an intermediate image 330 to wide angle lens stage 320. Wide angle lens stage 320 may be configured to generate and project corrected image 340 for display on screen 350.

Intermediate image 330 may be considered a distorted image (I(D)) such that wide angle lens stage receives a predistorted image. The distortion caused by wide angle lens stage is such that substantially all the distortion of intermediate image 330 is compensated for (cancelled) by wide angle lens stage 320 to generate image (I(−D)). The reference (I(−D)) is intended to indicate an image without the distortion of the intermediate image. It should be appreciated that the distortion can be to the image shape and/or the focal plane.

For purposes of the present description, the term "distortion," is intended to mean any change from the initial image inputted into the predistortion system. For example, in some embodiments, a distortion in the image includes an alteration in the shape of at least a portion of the image. The term "predistortion" is intended to mean an intentional distortion of an optical image that compensates for (i.e. is substantially equal and opposite to) distortion generated by the wide-angle projection system. It will be appreciated that the predistorted image may be presented in a variety of different configurations depending on the type of downstream distortion for which the predistorted image is intended to compensate.

The system described in FIG. 3 may include additional optics (not shown). For example, the system may include one or more prisms, etc. to direct the image along a desired, light path. Moreover, there may be one or more lenses configured to provide alter the intermediate image or the corrected image.

FIG. 4 illustrates one exemplary embodiment of a wide angle system described above. As illustrated, the system may include a DMD 410 adapted to provide an image to the lens system. An image can be provided to DMD 410 in any manner known in the art. DMD 410 may be configured to selectively reflect light from any suitable light source (not shown) to the lens system. Other types of devices (e.g., microelectromechanical systems (MEMS), grating light valve (GLV), liquid crystal display (LCD), liquid crystal on silicon (LCOS)) may be used to provide an image to the lens system.

Although other devices may be used to provide an image to the lens system, in the illustrated embodiment, prism 420 directs the image to relay lens group 430. Relay lens group 430 projects the image from prism 420 to prism 440 and distorts the image such that intermediate prism 440 receives an intentionally distorted intermediate image.

In one embodiment, relay lens group 430 includes 9 lenses; however, any number of lenses can be used, based on, for example, the desired distortion of the intermediate image, or the overall size of the lens system. The distortion to be caused by relay lens group 430 may be equal and opposite the distortion caused by wide angle lens group 450. In one embodiment, the intermediate image is approximately a half circle image in a warped image plane. In alternate embodiments, other types of distortion may be used. For example, if the full lens field is to be used, the distorted intermediate image would be a generally circular image. The image plane may or may not be warped.

Figure 11:
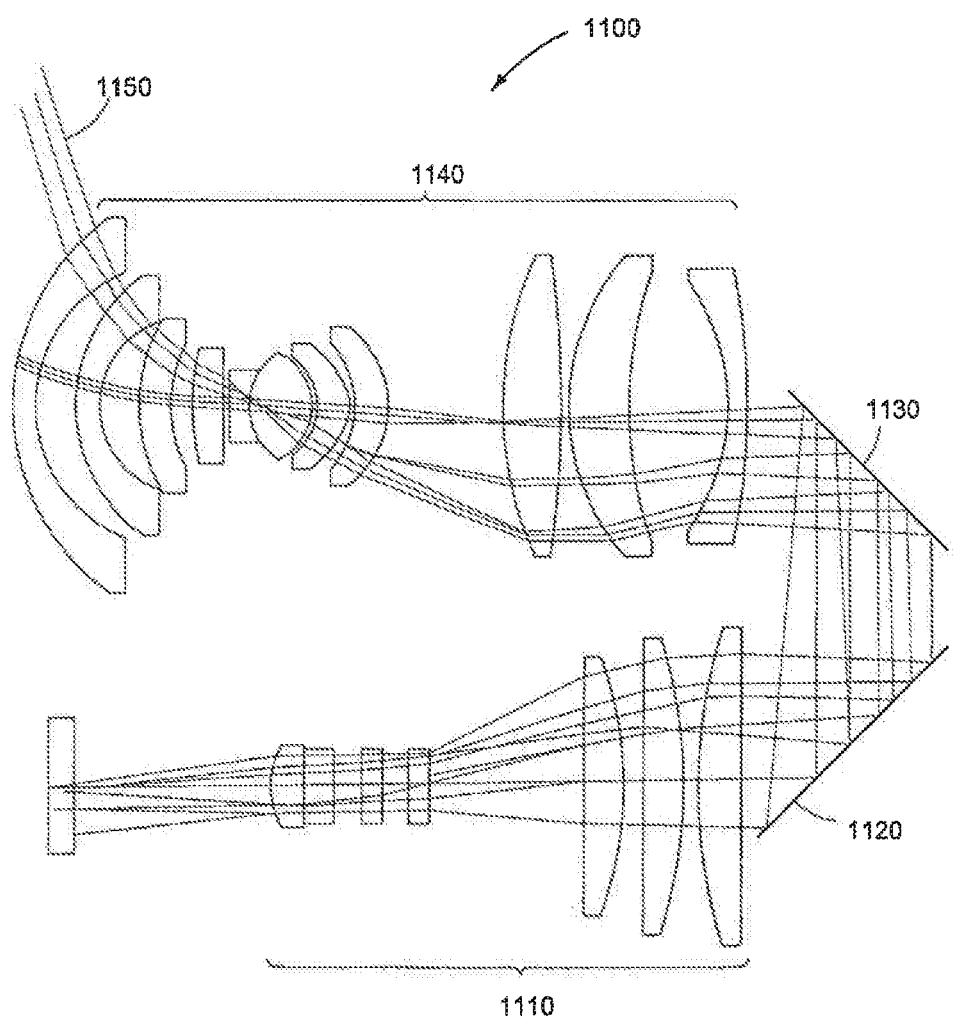
FIG. 11 is a schematic illustration of another lens system that may be used in a front projection display device of FIG. 2 according to an embodiment of the present disclosure.
Figure 12:
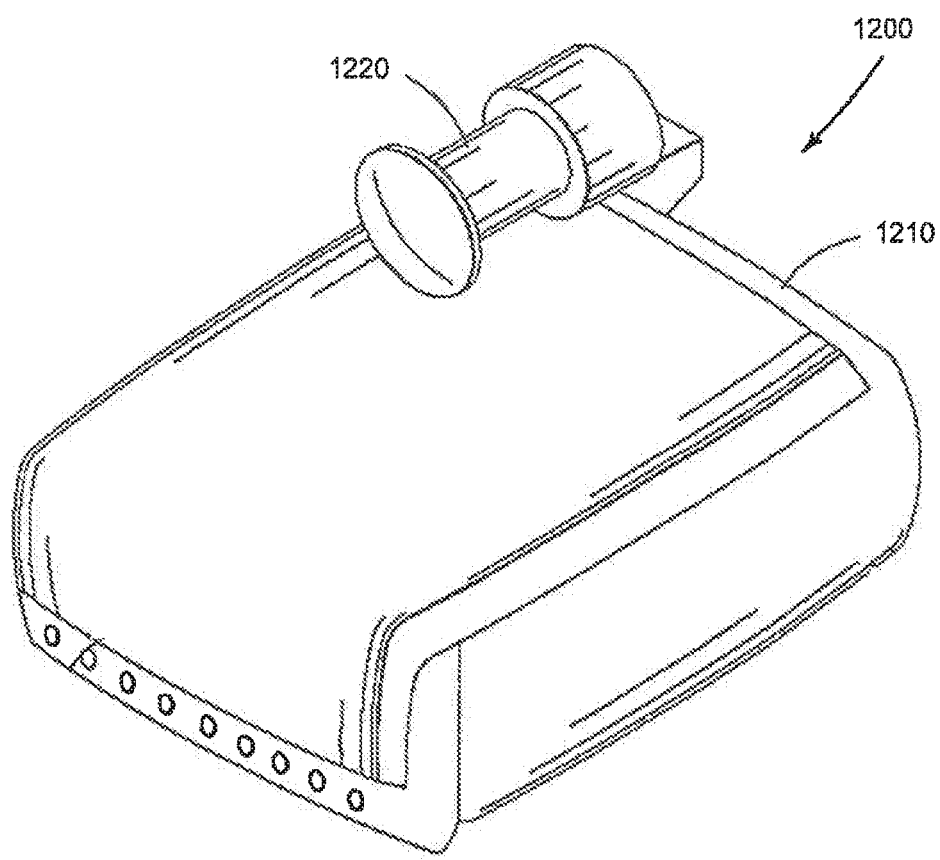
FIG. 12 illustrates a projector with the lens system shown in FIG. 11 according to an embodiment of the present disclosure.

Intermediate prism 440 may provide a 90.degree., fold of the image path. As described below with respect to FIG. 5, the fold is not required. Alternatively, other fold angles, for example, 45.degree., 30.degree., 135.degree., 180.degree., etc. could be used. Moreover, multiple folds may be used as shown in FIGS. 11-12 and discussed in more detail below. Wide angle lens group 450 projects the distorted intermediate image to a screen for display. Because wide angle lens group 450 causes distortion to the image to be projected and the intermediate image has been pre-distorted by relay lens group 430, the resulting image projected by the lens system has little or no distortion. In one embodiment, the total distortion caused by relay lens group 430, wide angle lens group 450 and any associated prisms may be less than 3%.

In one embodiment, the optic axes of the lenses of relay lens group 430 may be aligned. Similarly, the optic axes of the lenses of wide angle lens group 450 also may be aligned. Typically, wide angle lens group provides a field angle of greater than 100.degree. In one embodiment, the field angle is 153.degree.; however, any other angle can be provided. In some embodiments, the optical axis of wide angle lens group 450 is perpendicular to the screen so that keystone, or trapezoidal distortion is absent.

Figure 5:
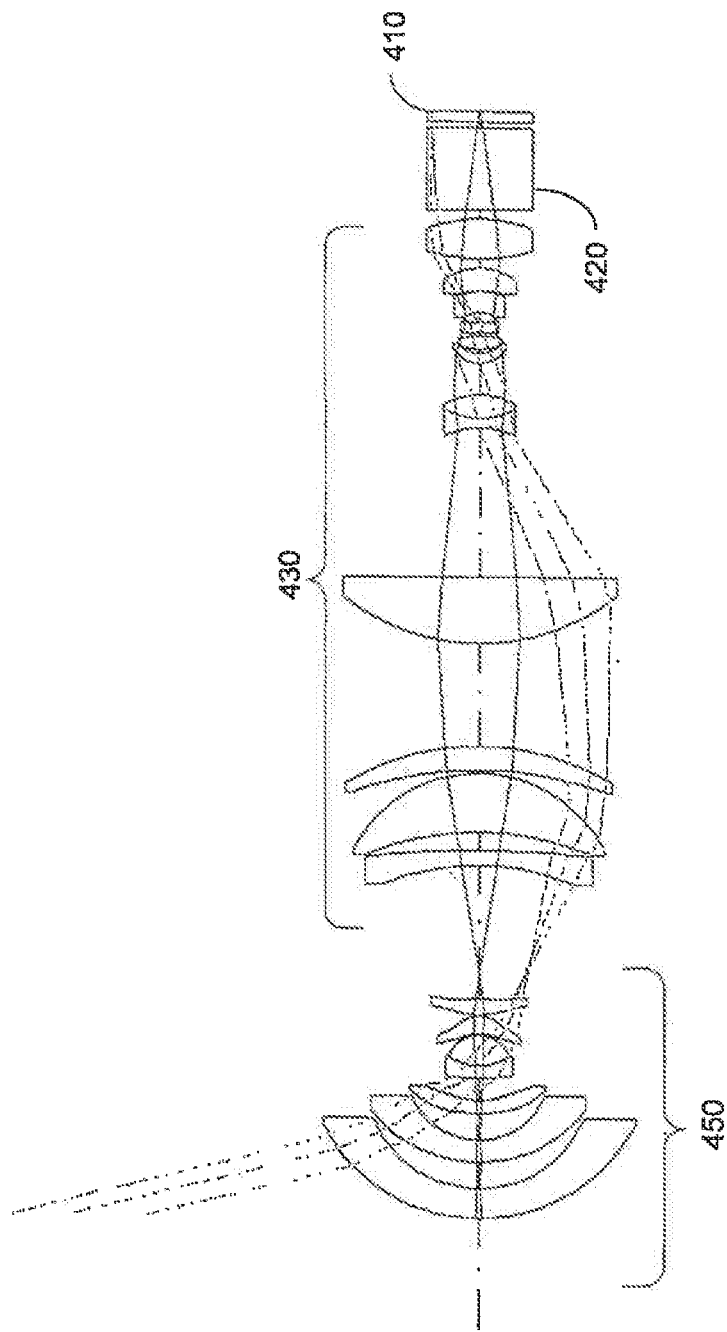
FIG. 5 is a schematic illustration of another lens system that may be used in the front projection display device of FIG. 2 according to an embodiment of the present disclosure.

FIG. 5 illustrates another embodiment of a wide angle lens system having a distorted intermediate image. The lens system of FIG. 5 is similar to the lens system of FIG. 4 except that the lens system of FIG. 5 is not folded. That is, wide angle lens system 450 is co-axial with relay lens system 430. The lens system of HG. 5 does not include an intermediate prism. An intermediate prism can be included, if desired.

Figure 6:
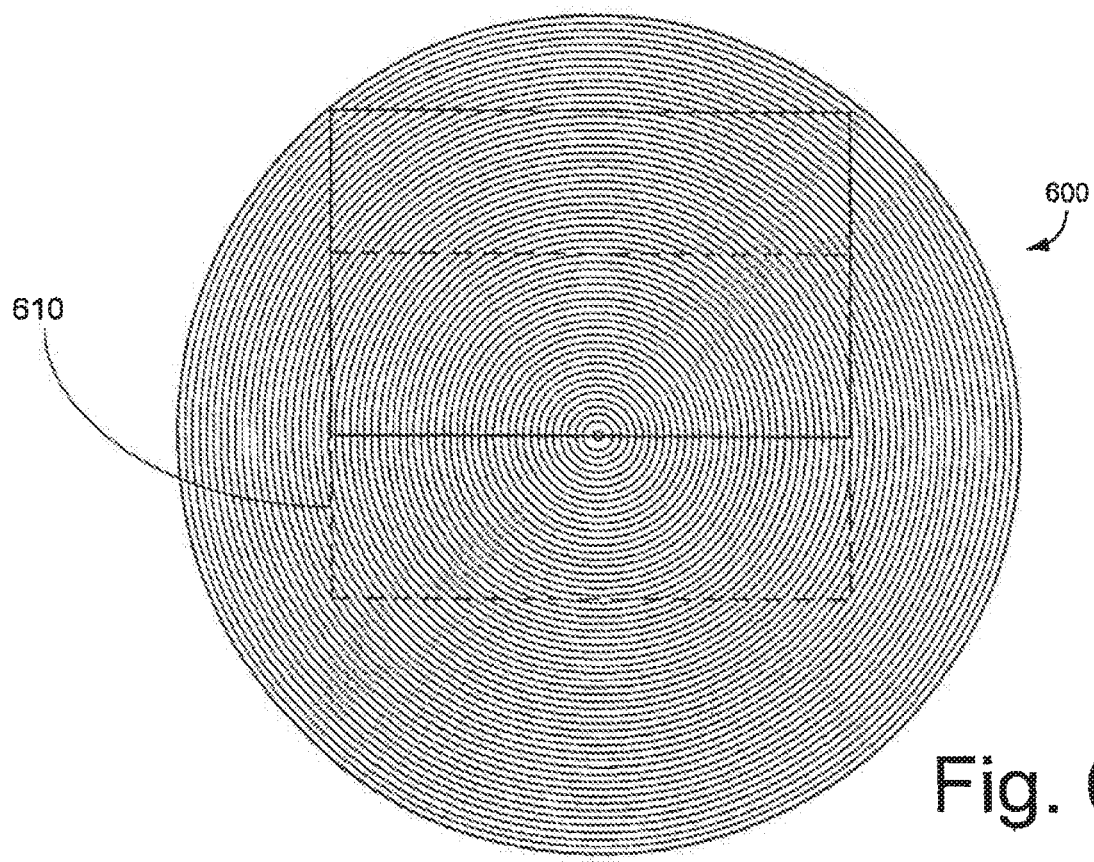
FIG. 6 is an illustration of a Fresnel screen for use with the front projection display device of FIG. 2.

As described above, the image may be projected to a screen. In some embodiments, the screen may be a portion of a Fresnel lens. FIG. 6 illustrates a Fresnel lens 600 with exemplary outlines of sections, such as the section indicated at 610 which may be used as a screen, although other sections may be used. The size and shape of the portion of the lens to be used corresponds to the size and shape of the screen of the display device.

In one embodiment, Fresnel lens 600 can have many concentric grooves having one or more predetermined groove angles. There may be regions or zones with different groove angles. Techniques for manufacturing and using Fresnel lenses having groove angle are known in the art.

Figure 7:
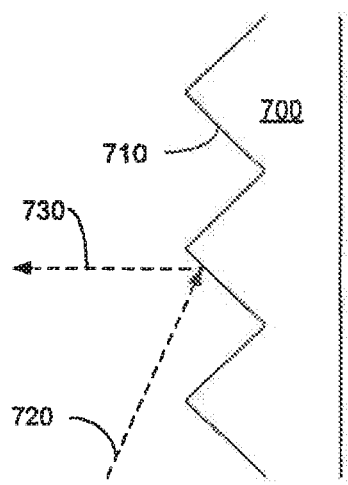
FIG. 7 is a cross-sectional view of the Fresnel screen of FIG. 6 according to an embodiment of the present disclosure.

FIG. 7 illustrates a cross-sectional profile of a screen for use in a front projection system. As schematically illustrated, screen 700 may be a Fresnel lens with, a plurality of grooves (peaks) on the screen surface. Each groove includes reflective facets 710 that are configured to reflect impinging light (input light) 720 towards a viewer as indicated at 730. Such a configuration may accommodate light received from a steep angle, such as in the system shown in FIG. 2. If should be noted that the angle of the grooves and the reflection angle may vary to accommodate the angle of the input light. Moreover, the opposing upward faces of the grooves may be adapted to prevent stray light from being reflected toward the viewer.

It should be appreciated that the grooves may be substantially large to enable cleaning of the facets without damaging the surface of the screen. In some embodiments, the surface of the screen may be charged to repel dust and other contaminants from collecting on the surface of the screen. For example, a user-selectable device may be provided that enables a charge to be sent through the surface of the screen, repelling any dust from the surface of the screen. Other methods may be provided for cleaning screen 700. For example, forced air, including the use of an air canister or air curtain, may be used to clean the screen.

Other types of screen surfaces and screens may be used to accommodate a steep angle projector as shown in FIG. 2. For example, the screen may be a lenticular screen. A lenticular screen may include multiple very small half-cylindrical lenses (lenticules) spaced close together. In some embodiments, the lenticular screen may be a single-sided reflective screen, similar to the configuration shown in FIG. 7 for the Fresnel screen. Thus, although FIG. 7 is described in relationship to use of a Fresnel lens, it should be appreciated that the lens may be a lenticular screen. Light may impinge the surface of such a lenticular screen at a steep angle and be reflected along a horizontal or other desired plane to a viewer.

Figure 8:
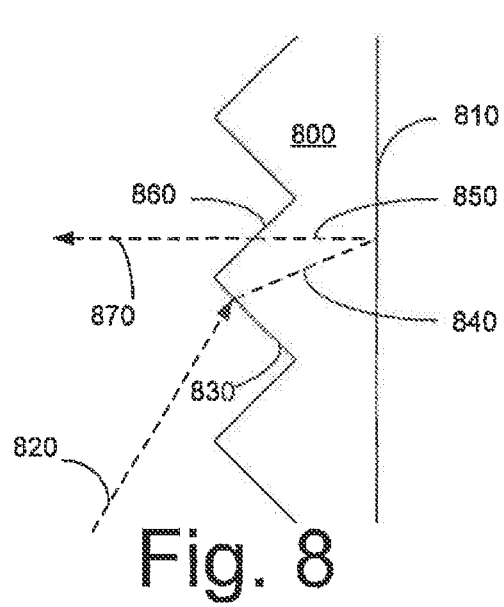
FIG. 8 is another cross-sectional view of a configuration of a screen including a reflective back mirror for use with the front projection display device of FIG. 2 according to an embodiment of the present disclosure.

FIG. 8 illustrates another embodiment for a screen for a front projection system at 800. The screen may be a single-sided fresnel lens or linear prism sheet and may include a mirror 810 or similar reflective surface on the back side of the screen. Input light 820 may pass through the face 830 of the lenses and may be slightly refracted 840. The refracted light 840 may then be reflected off of a reflective surface (e.g. mirror) 810 and redirected back through the screen. The reflected light 850 may pass through the back side 860 of the lens toward the viewer, as indicated at 870.

Figure 8A:
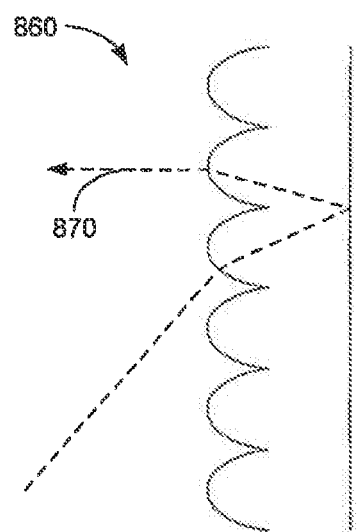
FIG. 8A is another cross-sectional view of a configuration of a screen including a lenticular sheet for use with the front projection display device of FIG. 2 according to an embodiment of the present disclosure.

In a similar embodiment, shown in FIG. 8A, the screen may be a lenticular sheet, as shown at 860. The light 870 may pass through the face of the lenticules, be slightly refracted, reflected off the back wall, and redirected back through another lenticule.

Still in other embodiments, the lenticular screen may be double sided. For example, the front side of the lenticular screen may include horizontal lenticules configured to change the vertical orientation of the light. The back side of the screen may include vertical lenticules configured to change the horizontal, distribution of the light.

Figure 9:
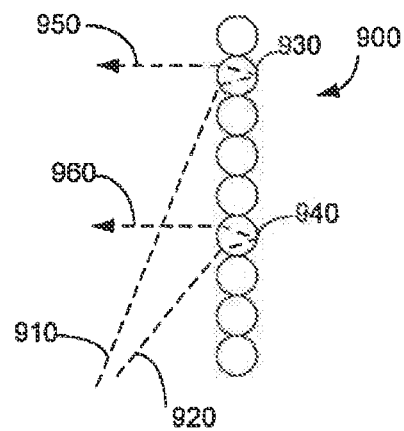
FIG. 9 is another cross-sectional view of a configuration of a screen including bead structures for use with the front projection display device of FIG. 2 according to an embodiment of the present disclosure.

FIG. 9 further illustrates, at 900, another embodiment where the screen surface includes a plurality of glass bead type structures. The glass beads may be configured to redirect the light depending on the entry angle of the input light. Thus, the shape of the beads may vary depending on the position of the beads in accordance with the angle of input light received. For example, in FIG. 9, input light 910 and 920 is directed toward screen 900. Input light 910 and 920 impinge beads 930 and 940, respectively. Beads 930 and 940 may be configured to redirect the light outwards toward the viewer on a horizontal plane (as indicated by 950 and 960 respectively). It should be appreciated that the entrance angle of light into the beads may vary along the vertical axis of the screen. The refractive and reflective characteristics of the beads may correlate to the various entrance angles.

Figure 10:
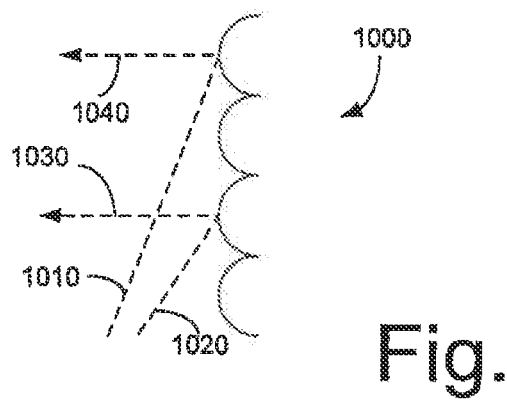
FIG. 10 is another cross-sectional view of a configuration of a screen including reflective bumps for use with the front projection display device of FIG. 2 according to an embodiment of the present disclosure.

FIG. 10 further illustrates another screen surface 1000. As illustrated, the screen may have a plurality of reflective bumps or other suitable surface topology. The bumps may be configured to receive input rays 1010 and 1020 from a substantially steep angle and direct the light back towards a viewer along a horizontal plane as shown by rays 1030 and 1040 respectively.

The above screens may be configured to receive light from a steep angle, such as from the wide-angle lens systems described above. Each screen may further be configured with surface topographies that are adapted to reflect light back to a viewer along a horizontal plane or other suitable viewing plane.

It should be appreciated that each of the screen surfaces described above may be sized to prevent any significant interruption to the focus of the image. Moreover, it should be noted that the surfaces described above may be configured to be substantially durable such that the screens can accommodate handling and touching by a user. Additionally, the screens surfaces may be configured to be easily cleaned. For example, coatings and other surface treatments may be applied to the screen surface to reduce static, dust, etc and/or to protect the surface. Moreover, the grooves and other surface topography may be substantially sized to enable easy cleaning of the surface. In some embodiments, the screen surfaces may include anti-static coatings and other surface treatments to enhance image quality and durability of the screen.

FIG. 11 further illustrates another exemplary lens system, indicated generally at 1100. In the exemplary lens system, the image path includes multiple folds. Specifically, the image path is directed through a first relay lens group 1110, through direction changing optics 1120, 1130 to wide angle lens system 1140. In the illustrated configuration, light (the image path) is redirected by over 180 degrees. Any suitable optical arrangement may be used to change the direction of light. In the exemplary embodiment, two fold mirrors or prisms 1120, 1130 may be used so that the direction of light is changed by approximately 180 degrees. Other optical devices and number of folds of the image path may be used without departing from the scope of the invention. For example, other combinations of prisms and/or mirrors may be used to alter the image direction 180 degrees or more. The multiple fold arrangement reverses the light direction such that output light is redirected in the same or substantially the same direction as input light (albeit different horizontal planes).

As with the lens systems described above, the lens system in FIG. 11 may be configured to produce a distorted intermediate image. The distortion of the intermediate image may be corrected using a wide angle lens stage which may create distortion substantially equal and opposite to the distortion of the intermediate image. In some embodiments, the distortion of the intermediate image may be created by the use of a relay lens stage, as previously described.

Each of these lens systems may be considered to, have a predistortion system, such as the relay lens stage, which is configured to create a predistorted image (or intermediate image) from an original image. The lens systems may further be understood to have a receiving projection system, such as the wide angle lens system, which is configured to receive the predistorted image and distort the image to substantially cancel the predistortion of the predistorted image and to project a substantially non-distorted image corresponding to the original image.

The lens system may be configured to direct the image 1150 from the wide angle lens stage to a screen. In some embodiments, the lens system may be configured to direct the image to a screen at a steep angle. For example, the lens system may be configured to direct the light at an angle of 30 to 80 degrees toward a screen. The light may impinge the screen on a first side and be redirected back toward a viewer on the same side (first side) of the screen. Any suitable screen, such as those described above, may be used to receive the image from the lens system.

FIG. 12 further illustrates, at 1200, the use of the lens system (as shown in FIG. 11) with a projector 1210. As illustrated, the lens system 1220 may be coupled to a projector. For example, the lens system may be removably coupled to a projector. Alternatively, the lens system may be integrated into a projector. By using the multiple fold system, the length of the lens may be decreased creating a more compact system. The orientation of the lens on the projector enables the main body of the projector to be positioned in close proximity to a wall. Such a configuration may reduce the shelf space required for the projector when in operation, while still providing the minimum throw distance required by the lens system. For example, the projector of FIG. 12 may be placed within 2 to 10 inches from a wall while producing a very large, 50-inch to 100-inch image.

The system of FIG. 12 further offsets the display device up. In contrast to some previous display systems, where the offset of the display device is down and the displayed image is offset up above the plane of the projector, the present system is set such that the display device is offset up in order to make the image offset up. For example, in some embodiments in the present system, the intermediate image produced by the lens system may require an offset. For example, in FIG. 12, folding the lens and reversing the light direction may function to put the display offset into a desired position.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and sub-combinations of the various elements, features, functions and/or properties disclosed herein. Where claims recite "a" or "a first" element or equivalent thereof, such claims should be understood to include incorporation of one or more such elements, neither requiring, nor excluding, two or more such elements.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A lens system comprising:
    a first fold mirror and a second fold mirror, the second fold mirror being disposed on an enlargement side of the first fold mirror;
    a first positive lens disposed on a reduction side of the first fold mirror;
    a second positive lens disposed on an enlargement side of the second fold mirror; and
    at least three negative lenses disposed on the enlargement side of the second fold mirror, wherein:
        an image path includes a first part directed through the first positive lens, a second part between the first fold mirror and the second fold mirror, and a third part directed through the second positive lens,
        the first part of the image path is substantially orthogonal to the second part of the image path,
        the third part of the image path is substantially orthogonal to the second part of the image path,
        the first part of the image path is substantially parallel to the third part of the image path,
        a light direction in the first part is opposite to a light direction in the third part,
        the second positive lens is disposed between the second fold mirror and the three negative lenses,
        the three negative lenses include a first negative lens,
        the first negative lens is disposed on a most enlargement side of the lens system, and
        a diameter of the first negative lens is larger than a length of the first fold mirror.

2. The lens system according to claim 1, wherein the first positive lens has a convex surface protruding toward the reduction side.

3. The lens system according to claim 1, wherein the first positive lens has a convex surface protruding toward the enlargement side.

4. The lens system according to claim 1, wherein the first positive lens has a flat surface.

5. The lens system according to claim 1, wherein the second positive lens has a convex surface protruding toward the reduction side.

6. The lens system according to claim 1, wherein the second positive lens has a convex surface protruding toward the enlargement side.

7. The lens system according to claim 1, wherein the second positive lens has a flat surface.

8. The lens system according to claim 1, wherein at least one of the three negative lenses has a convex surface protruding toward the enlargement side.

9. The lens system according to claim 1, wherein at least one of the three negative lenses has a concave surface.

10. The lens system according to claim 1, wherein at least one of the three negative lenses is a meniscus lens.

11. The lens system according to claim 1, wherein:
the three negative lenses include a first negative lens, and
the first negative lens is disposed on a most enlargement side of the lens system.

12. The lens system according to claim 1, wherein:
the three negative lenses include a first negative lens and a second negative lens,
the first negative lens is disposed on a most enlargement side of the lens system, and
the second negative lens is arranged adjacent to the first negative lens.

13. The lens system according to claim 1, wherein:
the three negative lenses include a first negative lens, a second negative lens, and a third negative lens,
the first negative lens is disposed on a most enlargement side of the lens system,
the second negative lens is arranged adjacent to the first negative lens, and
the third negative lens is arranged adjacent to the second negative lens.

14. The lens system according to claim 1, wherein:
the three negative lenses include a first negative lens, a second negative lens, and a third negative lens,
the first negative lens is disposed on a most enlargement side of the lens system,
the second negative lens is arranged adjacent to the first negative lens,
the third negative lens is arranged adjacent to the second negative lens, and
the second positive lens is disposed between the second fold mirror and the third negative lens.

15. The lens system according to claim 1, wherein:
the three negative lenses include a first negative lens,
the first negative lens is disposed on a most enlargement side of the lens system, and
a diameter of the first negative lens is largest in the three negative lenses.

16. The lens system according to claim 1, wherein
the three negative lenses include a first negative lens, and a second negative lens,
the first negative lens is disposed on a most enlargement side of the lens system,
the second negative lens is arranged adjacent to the first negative lens, and
a diameter of the first negative lens is larger than a diameter of the second negative lens.

17. The lens system according to claim 1, wherein:
the three negative lenses include a first negative lens, a second negative lens, and the third negative lens,
the first negative lens is disposed on a most enlargement side of the lens system,
the second negative lens is arranged adjacent to the first negative lens,
the third negative lens is arranged adjacent to the second negative lens, and
a diameter of the first negative lens is larger than a diameter of the second negative lens.

18. The lens system according to claim 1, wherein:
the three negative lenses include a first negative lens, a second negative lens, and the third negative lens,
the first negative lens is disposed on a most enlargement side of the lens system,
the second negative lens is arranged adjacent to the first negative lens,
the third negative lens is arranged adjacent to the second negative lens,
a diameter of the first negative lens is larger than a diameter of the second negative lens, and
a diameter of the second negative lens is larger than a diameter of the third negative lens.

19. A lens system comprising:
a first fold mirror and a second fold mirror, the second fold mirror being disposed on an enlargement side of the first fold mirror;
a first positive lens disposed on a reduction side of the first fold mirror;
a second positive lens disposed on an enlargement side of the second fold mirror; and
at least three negative lenses disposed on the enlargement side of the second fold mirror, wherein:
an image path includes a first part directed through the first positive lens, a second part between the first fold mirror and the second fold mirror, and a third part directed through the second positive lens,
the first part of the image path is substantially orthogonal to the second part of the image path,
the third part of the image path is substantially orthogonal to the second part of the image path,
the first part of the image path is substantially parallel to the third part of the image path,
a light direction in the first part is opposite to a light direction in the third part,
the second positive lens is disposed between the second fold mirror and the three negative lenses,
the three negative lenses include a first negative lens,
the first negative lens is disposed on a most enlargement side of the lens system, and
a diameter of the first negative lens is larger than a length of the second fold mirror.

20. The lens system according to claim 1, wherein the lens system has a cemented lens.

21. The lens system according to claim 1, wherein the lens system has a third positive lens disposed on the reduction side of the first positive lens.

22. The lens system according to claim 1, wherein the lens system has a third positive lens disposed on the enlargement side of the second positive lens.

23. The lens system according to claim 1, wherein the lens system focuses an intermediate image on the third part of the image path.

24. The lens system according to claim 1, wherein:
the first positive lens is disposed in a first direction with respect to the first fold mirror, and
the second positive lens is disposed in the first direction with respect to the second fold mirror.

* * * * *